United States Patent

[11] 3,629,104

| [72] | Inventor | Jim Maddox, Jr. |
|---|---|---|
| | | Houston, Tex. |
| [21] | Appl. No. | 649,823 |
| [22] | Filed | June 29, 1967 |
| [45] | Patented | Dec. 21, 1971 |
| [73] | Assignee | Texaco Inc. |
| | | New York, N.Y. |

[54] WATER SOLUBLE CORROSION INHIBITORS FOR WELL FLUIDS
2 Claims, No Drawings

[52] U.S. Cl................................................. 252/8.55 E,
21/27, 252/372, 260/307.6
[51] Int. Cl....................................................... C23f 11/14,
C07l 19/34
[50] Field of Search........................................... 252/8.55 E,
392; 260/309.6

[56] References Cited
UNITED STATES PATENTS

| RE23,227 | 5/1950 | Blair et al. | 252/8.55 |
|---|---|---|---|
| 2,738,325 | 3/1956 | Rydell | 252/8.55 |
| 2,773,879 | 12/1956 | Sterlin | 252/392 X |
| 2,839,465 | 6/1958 | Jones | 252/8.55 |

Primary Examiner—Herbert B. Guynn
Assistant Examiner—H. A. Pitlick
Attorneys—K. E. Kavanagh and Thomas H. Whaley

ABSTRACT: Normal and acid salts of substituted imidazolines and saturated aliphatic mono- and dicarboxylic acids for use in compositions of water soluble corrosion inhibitors. Continuous or intermittent application of liquid coatings of these inhibitors on metals, particularly ferrous metals in contact with sweet and sour petroliferous well fluids, form persistent films which afford protection against corrosion, even at elevated temperature.

WATER SOLUBLE CORROSION INHIBITORS FOR WELL FLUIDS

BACKGROUND OF THE INVENTION

This invention relates to inhibiting corrosion of metals found in contact with petroliferous well fluids or present in the production of natural gas. It is more particularly concerned with improved water soluble compositions of normal and acid salts of imidazoline and saturated aliphatic mono- and dicarboxylic acids to prevent corrosion of metals, particularly ferrous metals in oil and gas production, collection, and distribution systems, and in the refinery.

The principal corrosive agents found in petroliferous well fluids and in the production of natural gas include hydrogen sulfide, carbon dioxide, oxygen, organic acids, and solubilized salts. These agents may be present individually or in combination with each other. Valves, fittings, tubing, pumps, precipitators, pipe lines, sucker rods, and other components of oil drilling and producing equipment are particularly susceptible to corrosion. Deposits of rust, scale, corrosive byproducts, paraffin, and other substances create ideal situations for concentration cells, and pits form under the deposits. Acidic condensate that collects on metal tubing in gas condensate wells may also cause pitting. Furthermore, in sour gas or oil fields, it is common for sulfide attack on sucker rods and producing strings to cause deep pits, cracks, or even complete breaks. Downhole well temperatures may exceed 300° F. and accelerate corrosion.

Corrosion that occurs in primary production and water injection systems is rather complex. Evaluation of corrosion inhibitors for such applications should include the study of variables such as: composition of water, oils and gases; fluid level of the wells; method and rate of production; water-oil ratio; wetting power of the oil; pH of the well fluids; bottomhole temperatures; quantity of hydrogen sulfide, carbon dioxide, oxygen, and other gases present; formation of the protective coatings such as paraffin from the oil or calcium carbonate from the water; and, composition of inhibitor and method of application.

Waterflooding is a secondary method of oil recovery designed to improve the economic yield of an oil field. By introducing brine or water under pressure through one well, oil in the reservoir rock is displaced and forced to move toward other wells from which is is removed from the ground by the usual primary recovery methods. Among the more important variables having a bearing on the results of the waterflooding process are permeability, porosity and size of the pore openings of the reservoir rock and the viscosity, density, and surface tension of the oil.

It is important in selecting a water supply for use in flooding operations that it should be chemically inactive and free of sediment that might clog the pore space of the reservoir rock. Heretofore, most commercial inhibitors added to a brine well water supply for flooding operations caused turbidity in the water. Precipitated organic materials would then "plug" the pore sections of the reservoir rock surrounding the injection wells. This would lower water input rates and reduce the ultimate oil recovery per acre. In practice, the oil-produced to water-injected ratio for a successful water-flooding operation ranges from 1:10 to 18.

In order to reduce inventories, achieve cost reduction by volume purchases, and obtain maximum treating effectiveness, the product of this invention was developed and constitutes a class of corrosion inhibitors and compositions thereof which afford protection to metals in a variety of corrosive environments.

SUMMARY OF THE INVENTION

Water soluble corrosion inhibitors for protecting metals in contact with petroliferous well fluids are prepared by reacting an aliphatic saturated monocarboxylic acid containing from one to three carbon atoms, or an aliphatic saturated dicarboxylic acid containing from three to nine carbon atoms with substituted imidazolines to produce the normal and acid salts. The imidazolines are prepared by reacting either a tall oil fatty acid selected from the group consisting of linoleic, conjugated linoleic, oleic, palmitic, stearic, and mixtures thereof, or a polymerized carboxylic acid such as dimerized linoleic acid with a polyalkylene polyamine such as diethylenetriamine (DETA), triethylenetetramine (TETA) and tetraethylenepentamine (TEPA).

The life of metal piping or carbon steel equipment normally in contact with sweet and sour petroliferous well fluids at temperatures up to 300° F. may be extended by treating the well fluids with these inhibitors. By either continuous or intermittent application, persistent protective films of these organic inhibitors may be formed on metal surfaces and thereby protect them from corrosion.

It is therefore a principal object of the present invention to provide a water soluble corrosion inhibitor for addition to sweet and sour petroliferous well fluids and to the brine well water supply in waterflooding operations to inhibit corrosion and cracking of metals contacted by said fluids.

Another object of this invention is to provide an improved process for preventing the corrosion of metals in oil and gas production, collection, and distribution systems, and in the refinery.

It is a further object of this invention to provide an improved low cost water soluble corrosion inhibitor for use in preventing ferrous metal oil producing apparatus from corroding due to aqueous carbonic acids, sulfides, and soluble aliphatic acids encountered in hot petroliferous well fluids and in the production of natural gas.

DETAILED DESCRIPTION OF INVENTION

According to the instant invention, novel water soluble dispersant-free corrosion inhibitors are produced by reacting water soluble saturated aliphatic mono- and dicarboxylic acids and a substituted imidazoline to produce members of a class of imidazoline-aliphatic acid salts having the generic formula

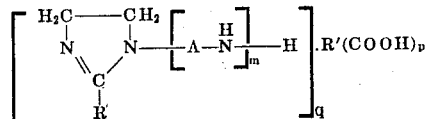

in which R attached to the two-carbon atom of each imidazoline ring is the residual radical of fatty acid selected from the group consisting of a tall oil fatty acid, and a polymerized carboxylic acid containing from 15 to 70 carbon atoms; A attached to the 1-nitrogen atom of each imidazoline ring is an ethylene or propylene group and $m$ is an integer from one to six; $p$ indicates the valence of R' and is the integer one for monocarboxylic acids and two for dicarboxylic acids; R' is a saturated aliphatic residual radical containing from zero to two carbon atoms when $p$ is the integer one and from one to seven carbon atoms when $p$ is the integer two; and $q$ is the integer one when $p$ is one and the integer one or two when $p$ is two.

In one embodiment of the invention, a 1-aminoalkyl-2-alkyl-2-imidazoline, is prepared by reacting stoichiometric amounts of a high molecular weight monocarboxylic fatty acid containing from 17 to 32 carbon atoms with a polyalkylene polyamine of the formula $H_2N—[A-NH]_xH$, where A is bivalent radical selected from the group consisting of ethylene and propylene and $x$ is an integer from two to seven. Specifically, one or more of the fatty acids in tall oil may be condensed with a polyalkylene polyamine such as diethylenetriamine, triethylene fetramine, and tetraethylenepentamine to provide the 1-aminoaklyl-2-alkyl-2-imidazoline, as described more fully below. Finally, the precursor, 1-aminoalkyl-2-alkyl-2-imidazoline, is neutralized with saturated aliphatic mono- or dicarboxylic acids to produce the imidazoline-aliphatic acid salt corrosion inhibitors of this invention. The term, tall oil fatty acids, as used herein refers to the following fatty acids or mixtures thereof: oleic, linoleic, conjugated linoleic, palmitic, and stearic.

Water soluble saturated aliphatic monocarboxylic acid adducts suitable for neutralizing the imidazoline include formic, acetic and propionic acids. Similarly, water soluble saturated aliphatic dicarboxylic acids suitable for neutralizing the imidazoline include malonic, succinic, glutaric, adipic, pimelic, suberic and azelaic.

In another embodiment of the invention, an imidazoline is prepared by condensing at least one of the carboxyl groups of a polymerized fatty acid with at least 1 mole of the previously described polyalkylene polyamine. The term, polymerized carboxylic fatty acids, as used herein refers to the following polymeric acids and mixtures thereof: dimer and trimer fatty acids, and higher molecular weight polymeric fatty acids. Complex polyimidazoline structures may be produced by condensing two or more carboxylic groups of a polymeric polycarboxylic fatty acid with 2 or more moles of a polyalkylene polyamine.

In concentrations from about 10–200 parts per million, the corrosion inhibiting compositions employed in the practice of this invention are extremely and surprisingly effective in protecting oil and gas well tubing and field equipment from corrosion even at temperatures to 300° F. It is postulated that the corrosion inhibitor forms an adherent protective film on the surface of the metal that resists the penetration of corrosive agents. The polar parts (nitrogen and oxygen) of the inhibitor molecule have an affinity for metal and bond the remainder of the macro molecule to the surface of the metal. The spacious organic residue constituting the imidazoline-aliphatic acid salt molecule contributes to the thickness and extent of the film. The NH groups in the molecular chain provide residual buffering power for acidic compounds found in sweet and sour petroliferous well fluids.

Of the many methods of treating wells with corrosion inhibitors, two of the most commonly used may be referred to as Periodic and Continuous treatments. Periodic or batch treatment of pumping wells comprises putting the corrosion inhibitor into the casing and tubing annulus and flushing it to the bottom by diverting the well stream from the flow line into the annulus. Produced fluids then dilute and entrain the inhibitors which coat contacting metal surfaces upon rising to the surface. In continuous treatment a small volume of inhibitor is injected into the production stream used to activate submerged hydraulic pumps in order to maintain a predetermined concentration of inhibitor.

PREFERRED EMBODIMENTS

The invention will be further illustrated but is not to be limited by the following preferred embodiments.

EXAMPLE I

To prepare the imidazoline-aliphatic acid salt corrosion inhibitor, a 1-aminoalkyl-2-alkyl-2-imidazoline was prepared first by refluxing 57.6 grams (0.2 mole) of Acintol FA1 tall oil fatty acid (to be described) and 20.6 grams (0.2 mole) of diethylenetriamine at a temperature of 280° C. for approximately 1.75 hours. During this time, 71 percent of the theoretical water formed by the reaction was collected. The reaction temperature was then increased to 290° C., and after about 1 hour 72.6 percent of the theoretically expected water was recovered and the amine equivalent of the reaction product was 198. The amine equivalent, which expresses the basicity of the reaction product in mg. of KOH per gr. of sample may actually range from 185 to 225. Progress of the reaction was followed by measuring the amount of water evolved and by inspection of amide (1,660–1,676 cm$^{-1}$) and imide (1,606–1,620 cm$^{-1}$) bands in the infrared spectrum.

The imidazoline may be prepared if preferred at a lower temperature by means of an alternate procedure using a toluene azeotrope to remove approximately all of the theoretical water of reaction. The reaction time for such a process is about 2 hours at a maximum temperature of 240° C.

In a preferred embodiment of the invention, tall oil imidazoline acetate is made by neutralizing the 1-aminoalkyl-2-alkyl-2-imidazoline with a stoichiometric amount of acetic acid dissolved in a (1:1) methanol-isopropanol solvent.

By varying the reaction conditions and in the presence of excess acid, one or more intermediate amines in the $\text{[A-NH]}_{m-1}$ chain may be also neutralized with a saturated aliphatic acid to form inner salts. Furthermore the tall oil imidazoline precursor to the imidazoline-aliphatic acid salt may be neutralized with saturated aliphatic dicarboxylic acids such as adipic and azelaic. If 1 mole of these dicarboxylic acids neutralizes 1 mole of the tall oil imidazoline precursor then the acid salt of imidazoline-aliphatic acid is formed. The normal salt is formed when each carboxylic radical of the dicarboxylic acid is reacted with an imidazoline group.

The imidazoline-aliphatic acid salt may be used alone in dispersant-free, water soluble corrosion inhibiting compositions. However, solvents, dispersants, weighting agents, and other materials may be mixed with the imidazoline-aliphatic acid salt to formulate various heat resistant corrosion inhibiting compositions for specific applications involving downhole protection of the oil well tubing.

Effective water-soluble corrosion inhibitor compositions for treating brines prior to their injection into low-permeability formations may be prepared from tall oil imidazoline acetate by diluting an alcohol solution with waster until the final total alcohol concentration is about 15–25 weight percent and the tall oil imidazoline acetate is about 25–32 percent. A 1 percent solution of this composition in distilled water is clear and shows little tendency to "salt out" in the brine. Evaluated by the "Continuous Exposure Test" to be described later, a concentration of 25 p.p.m. of a tall oil imidazoline acetate inhibitor in 10 percent light gas oil-90 percent brine gave corrosion penetration rates of 1.3 mpy and 5.7 mpy in "sweet" and "sour" environments respectively. In comparison, the rate of corrosion for unprotected specimens tested under the same conditions was 14.8 and 50.8 respectively.

Acintol FA1 used in the preparation of the precursor is a mixture of liquid tall oil fatty acids manufactured by the Arizona Chemical Co. and comprises:

| | |
|---|---|
| Rosin Acids, % | 4.2 |
| Unsaponifiables, % | 1.6 |
| Fatty Acids, Total % | 94.2 |

The fatty acid composition comprises:

| | |
|---|---|
| Polyunsaturated, Conjugated, as Linoleic, % | 8 |
| Polyunsaturated, Nonconjugated, as Linoleic, % | 36 |
| Oleic by difference, % | 52 |
| Saturated, % | 4 |

Acintol FA1 conforms to the following specification:

| | |
|---|---|
| Specific Gravity, 25°/25° C. | 0.91 |
| Acid Value | 195 |
| Saponification Value | 197 |
| Iodine Value (Wijs) | 131 |
| Viscosity, SUS, 100° F. | 100 |
| Flash Point, open cup, ° F. | 380 |

Water soluble corrosion inhibitors are made also by the steps of first preparing a precursor consisting of a mono or polyimidazoline by reacting a polymerized carboxylic acid selected from the group consisting of dimeric, trimeric, and higher molecular weight polymerized carboxylic acids, and mixtures thereof, containing from 15 to 70 carbon atoms, with a polyalkylene polyamine, such as diethylenetriamine. Then the mono- or polyimidazoline is neutralized with an aliphatic mono- or dicarboxylic acid.

The polymerized carboxylic acid may be produced by the polymerization of unsaturated fatty acids in accordance with a method such as described in the Journal of the American Oil Chemists Society 24, 65 (1947). In the preparation of polymerized acids, members containing more than 3 moles as polymerized may not be commercially feasible. However, the higher members containing four or more acid residues (such as tetramers) may be present in the residues from the preparation of the dimer and trimer acids. These residues containing higher molecular weight polymeric carboxylic acids are also useful in the preparation of the precursors of the invention. Typical polymerized carboxylic acids include dimerized linoleic and eleostearic acids.

A suitable polymerized carboxylic acid is available commercially from the Harchem Division, Wallace & Tiernan, Inc., under the trade designation of Century D-75 polymerized fatty acid. Century D-75 is a polymeric carboxylic acid of high-molecular weight containing approximately 10 percent monomer, 35 percent dimer, and 55 percent trimer and other higher molecular weight polymeric carboxylic acids and conforms to the following specification:

| | |
|---|---|
| Free Fatty Acid (as Oleic) | 70–76% |
| Saponification Value | 175–185 |
| Iodine Value | 45–58 |
| Viscosity, SUS 210° F. | 325–400 |
| Molecular Weight (approx.) | 600 |

EXAMPLE II

Under conditions similar to those described in example I, equimolar amounts of Century D-75 acid are reacted with diethylenetriamine. The reaction product is neutralized at room temperature with acetic acid dissolved in a 16 wt. percent solution of acetic acid in 1:1 methanol-isopropanol.

Other water soluble formulations of imidazoline-aliphatic acid salts and their respective corrosion penetration rates are presented in table I. The testing procedure will be described in greater detail below.

Dynamic tests simulating field usage were used to evaluate the corrosion inhibitors of this invention for their ability to protect metals immersed either in sweet or sour fluids. Two methods of well treatment simulated by these tests are "Continuous Exposure" or constant concentration and "Persistent Filming" for intermittent high-concentration additions. A description of the test procedures follows.

General Test Procedure: A sand blasted mild steel test specimen, 3 inch × 0.5 inch × 0.005 inch thick is weighed and inserted in a 4 ounce glass bottle containing 100 ml. of a filming mix. One milliliter of 6 percent acetic acid is added to each bottle containing water or brine in the filming mix. The bottles are then attached to the spokes of a 23-inch diameter vertically mounted wheel and rotated for the time specified below at 30 r.p.m. in an oven maintained at 120° F. for sour filming mixes and 160° F. for sweet filming mixes. As the wheel revolves, the filming mix passes back and forth over the test specimen. At the end of the test period, the test specimen is removed from the bottle, washed with dilute acid, scrubbed with scouring cleanser, and reweighed. From the specimen weight loss, area, metal density, and time of exposure, calculations are made and test results are reported and the "Corrosion Penetration Rate" in mils per year (mpy).

Simulation of Continuous Treatment: Continuous addition of inhibitor is the oldest type of corrosion control treatment for wells producing hydrocarbons and water and in water-injection systems. Metal to be protected is continuously contacted with low concentrations of inhibitor in the range of about 10 to 100 p.p.m. basis total fluids. In the "Continuous Exposure Test," continuous well treatment is simulated in the laboratory by testing a fixed concentration of 25 p.p.m. of inhibitor in mixtures of 10 percent light gas oil and 90 percent synthetic brine and in 100 percent synthetic brine (10 percent NaCl + 0.5 percent $CaCl_2$). Sweet and sour environments are simulated by saturating the filming mixes respectively with carbon dioxide and hydrogen sulfide. The concentration of 25 p.p.m. is within the 10 to 100 p.p.m. mentioned previously and constitutes a severe test for most inhibitors. Steel test specimens are exposed to the filming inhibitor mix for 72 hours, in accordance with the general test procedure described above.

The preferred corrosion inhibitor compositions shown in table I were evaluated by the previously described "Continuous Exposure Tests." Penetration rates expressed in mils per year for steel specimens in contact with the corrosion inhibiting fluids and blank runs made on unprotected steel specimens under the three test conditions described are reported. A comparison of the test data shown in table I for the blank run clearly demonstrates the effectiveness of these compositions to prevent the corrosion of metals in petroliferous well fluids.

The compositions and process of the invention have been described generally and by examples with reference to particular compositions for purposes of clarity and illustration only. It will be apparent to those skilled in the art from the foregoing that various modifications of the process and the compositions disclosed herein can be made without departure from the spirit of the invention.

TABLE I.—WATER SOLUBLE FORMULATIONS OF IMIDAZOLINE-ALIPHATIC ACID SALTS AND THEIR CORROSION PENETRATION RATES

| | | Saturated aliphatic acid | | Water, wt. percent | 1:1 methanol isopropanol, wt. percent | Corrosion penetration rate, mils per year, continuous exposure test (25 p.p.m. inhibitor) | | |
|---|---|---|---|---|---|---|---|---|
| | | | | | | 100% synthetic brine, sour, 120° F. | 10% light gas oil–90% synthetic brine | |
| Imidazoline (25 wt. percent) | Amine equiv. | Name | Wt. percent | | | | Sweet, 160° F. | Sour, 120° F. |
| Acintol FA1 plus DTEA | 211 | Acetic | 7.1 | 47.9 | 20.0 | 4.6 | 1.3 | 5.7 |
| Do | 211 | Adipic | 8.6 | 46.4 | 20.0 | 4.6 | 1.4 | 6.8 |
| Do | 211 | Azelaic | 11.4 | 43.6 | 20.0 | 4.2 | 1.0 | 6.9 |
| Acintol FA1 plus TEPA | 409 | Acetic | 3.7 | 51.3 | 20.0 | 3.8 | 1.8 | 0.6 |
| Do | 313 | do | 4.8 | 50.2 | 20.0 | 5.0 | 1.2 | 7.6 |
| Century D-75 plus DETA | 384 | do | 4.0 | 51.0 | 20.0 | 4.4 | 1.6 | 7.4 |
| FA1 plus D-75 plus TEPA | 416 | do | 3.6 | 51.4 | 20.0 | 3.4 | | |
| Blank run (no inhibitor) | | | | | | 52.8 | 14.8 | 50.8 |

We claim:

1. A water soluble corrosion inhibiting composition consisting essentially of a. from about 25 to 32 weight percent of a salt represented by the formula of

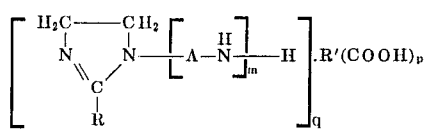

in which R is the residual radical of a high-molecular weight polymerized carboxylic fatty acid selected from the group consisting of dimerized linoleic acid and dimerized eleostearic acid, A is a bivalent ethylene radical, m is an integer from one to six, R' is a residual hydrocarbon radical of a water soluble saturated aliphatic organic acid selected from the group consisting of formic, acetic and propionic when p is one and malonic, succinic, glutaric, adipic, pimelic, suberic and azelaic when p is two, and q is the integer one when p is one and the integer one or two when p is two;

b. from about 15 to 25 weight percent of a 1:1 mixture of methanol and isopropanol; and c. from about 43 to 60 weight percent of water.

2. A process of inhibiting corrosion of ferrous oil and gas well equipment in contact with sweet and sour petroliferous well fluids comprising mixing said well fluids with the inhibiting composition of claim 1 to effect a minimum concentration by weight of inhibitor to well fluids of 10 parts per million.

* * * * *

PO-1050
(5/69)

UNITED STATES PATENT OFFICE
CERTIFICATE OF CORRECTION

Patent No. 3,629,104                    Dated December 21, 1971

Inventor(s) JIM MADDOX, JR.

It is certified that error appears in the above-identified patent and that said Letters Patent are hereby corrected as shown below:

| | |
|---|---|
| Col. 2, line 70 | Change "fetramine" to --tetramine-- |
| Col. 5, line 75 | After "reported" change "and" to --as-- |
| Table I Col. 1, line 2 | Change "DTEA" to --DETA-- |

Signed and sealed this 18th day of July 1972.

(SEAL)
Attest:

EDWARD M. FLETCHER, JR.
Attesting Officer

ROBERT GOTTSCHALK
Commissioner of Patents